United States Patent [19]

Uchida et al.

[11] Patent Number: 5,435,067
[45] Date of Patent: Jul. 25, 1995

[54] METHOD AND APPARATUS FOR INDEXING ATTACHMENT

[75] Inventors: Noboru Uchida; Tadashi Tanaka, both of Numazu, Japan

[73] Assignee: Toshiba Kikai Kabushiki Kaisha, Tokyo, Japan

[21] Appl. No.: 965,297

[22] PCT Filed: Jun. 5, 1992

[86] PCT No.: PCT/JP92/00731

§ 371 Date: Feb. 8, 1993

§ 102(e) Date: Feb. 8, 1993

[87] PCT Pub. No.: WO92/21479

PCT Pub. Date: Dec. 10, 1992

[30] Foreign Application Priority Data

Jun. 6, 1991 [JP] Japan .......................... 3-162179
Apr. 28, 1992 [JP] Japan .......................... 4-028494

[51] Int. Cl.⁶ ............................................. G05B 19/19
[52] U.S. Cl. .............................. 33/1 PT; 33/1 N; 33/534; 364/474.28
[58] Field of Search ............... 33/1 PT, 1 N, 533, 534, 33/626, 633, 634, 636, 641; 364/474.28

[56] References Cited

U.S. PATENT DOCUMENTS 4,138,633  2/1979  Narikiyo .................... 364/474.28
4,530,155  7/1985  Burkhardt et al. ............. 33/1 PT
4,881,021  11/1989  Hirai ....................... 364/474.28
5,065,324  11/1991  Oshita et al. ................. 33/1 PT
5,237,509  8/1993  Ueta et al. ................. 364/474.28

FOREIGN PATENT DOCUMENTS 0137544  8/1983  Japan ........................... 33/1 N
60-34251  2/1985  Japan .
86615  5/1986  Japan .......................... 33/1 PT

*Primary Examiner*—Christopher W. Fulton
*Attorney, Agent, or Firm*—Fish & Richardson;

[57] ABSTRACT

An attachment indexing apparatus which performs the steps of indicating an objective indexing position angle of an attachment by an indexing position angle indicating means 1, detecting the present position angle by a position detecting means 2, comparing the objective indexing position angle with the present position angle by an angle comparing means 3, determining the indexing rotation direction of the attachment by an indexing rotation direction determining means 4 in accordance with the compared result, calculating an indexing rotation angle of the attachment from the angle compared result and the indexing rotation direction by an indexing rotation angle calculating means 5, and indexing and rotating the attachment in accordance with the determined indexing rotation direction and the calculated indexing rotation angle.

10 Claims, 11 Drawing Sheets

METHOD AND APPARATUS FOR INDEXING ATTACHMENT

FIELD OF THE INVENTION

This invention relates to a method of indexing an attachment detachably mounted on an end portion of a spindle head of a machine tool through an angular position determining mechanism and to an apparatus for executing the method.

BACKGROUND ART OF THE INVENTION

In a relatively large numerical control (NC) machine tool such as a gate-shaped machining center, a ram is provided for holding a spindle in a rotatable manner, and an attachment is detachably mounted on a front end of the ram. The attachment has a rotatable shaft extending in a direction different from the spindle, such as a direction perpendicular to the spindle, and a tool is mounted on the rotatable shaft to thereby work a plurality of surfaces of a workpiece.

In order to work the various surfaces of the workpiece, it is necessary to change, i.e., index, the mounting position of the attachment with respect to the ram. The attachment is ordinarily mounted on the ram through an angular position determining mechanism such as a gear coupling. When an attachment indexing procedure is carried out, the attachment is moved forward together with the spindle to thereby disengage the gearing of the gear coupling then rotated by a predetermined angle and again engaged with the gear coupling.

In the prior art, such indexing rotation has been performed only in one direction such as in a clockwise direction or in a counterclockwise direction (for example, refer to Japanese Patent Laid-open (KOKAI) No. 34251/1985). Accordingly, in the case of a large angle of indexing rotation, much time is required for the indexing procedure, causing a lowering of the working efficiency.

Furthermore, at the time of indexing the attachment, backlash of the gears or torsion of the shaft is applied as an error, which results in an adverse reengagement of the gear coupling.

In an NC machine tool, when an automatic operation is interrupted for a reason such as breakage of the tool and the operation program is again started after repairing of the tool, it is necessary to obtain coincidence between the indexing position of the attachment on the program with the present indexing position thereof actually mounted on the machine tool and then to execute a re-starting of the program, for preventing interference between the attachment and the workpiece.

In the prior art, this obtaining of coincidence between the indexing position of the attachment on the program and the present indexing position thereof actually mounted on the machine tool is performed under the observation and confirmation of an operator, and the angular positioning of the attachment is carried out by a manual operation.

This method, however, involves a problem in that there is a possibility of the operator restarting the program without being aware of a deviation between these indexing positions, and, in such a case, the attachment and the workpiece will undergo mutual interference, thereby resulting in damage or breakage of the attachment or the workpiece.

SUMMARY OF THE INVENTION

This invention was conceived in view of the technical problems in the prior art described above and aims to provide a method of indexing an attachment and an apparatus for carrying out the method by which attachment indexing time is shortened and at the same time an angular position determining means for performing the final angular positioning can carry out indexing accurately.

Another object of this invention is to provide a method of indexing an attachment and an apparatus for carrying out the method in which the indexing position of the attachment in a program can be automatically made to coincide with an actual indexing position.

A method of indexing an attachment according to this invention for achieving the above objects comprises the steps of indicating an objective indexing position angle of the attachment, detecting the present position angle of the attachment, comparing the objective indexing position angle with the present position angle, determining the indexing rotation direction of the attachment in accordance with the comparison of the two position angles, calculating the amount of the indexing rotation direction from the compared result and the indexing rotation direction, and rotating the attachment in the determined indexing rotation direction through the indexing rotation angle.

An apparatus for indexing the attachment according to this invention comprises an indexing position angle indication means for indicating an objective indexing position angle of the attachment, a position angle detecting means for detecting the present position angle of the attachment, an angle comparing means for comparing the objective indexing position angle with the present position angle of the attachment, an indexing rotation direction determining means for determining the indexing rotation direction of the attachment in accordance with the compared result, an indexing rotation angle amount calculating means for calculating the indexing rotation angle of the attachment from the compared result and the indexing rotation direction, and an indexing-rotating means for indexing and rotating the attachment in accordance with the rotation direction determination result from the rotation direction determining means and the indexing rotation angle from the indexing rotation angle calculating means.

Another method of indexing the attachment according to this invention comprises the steps of storing in a memory means the stop position angle of an attachment at an operation stop time, calling back the stop position angle of the attachment from the storing means, and indexing and rotating the attachment to the called back stop position angle.

Furthermore, another apparatus for indexing the attachment according to this invention comprises a memory means for storing the stop position angle of an attachment at an operation stop time and an indexing-rotating means for calling back the stop position angle of the attachment from the memory means and indexing and rotating the attachment to the called back stop position angle.

DESCRIPTION OF THE PREFERRED EMBODIMENTS

Figure 1:
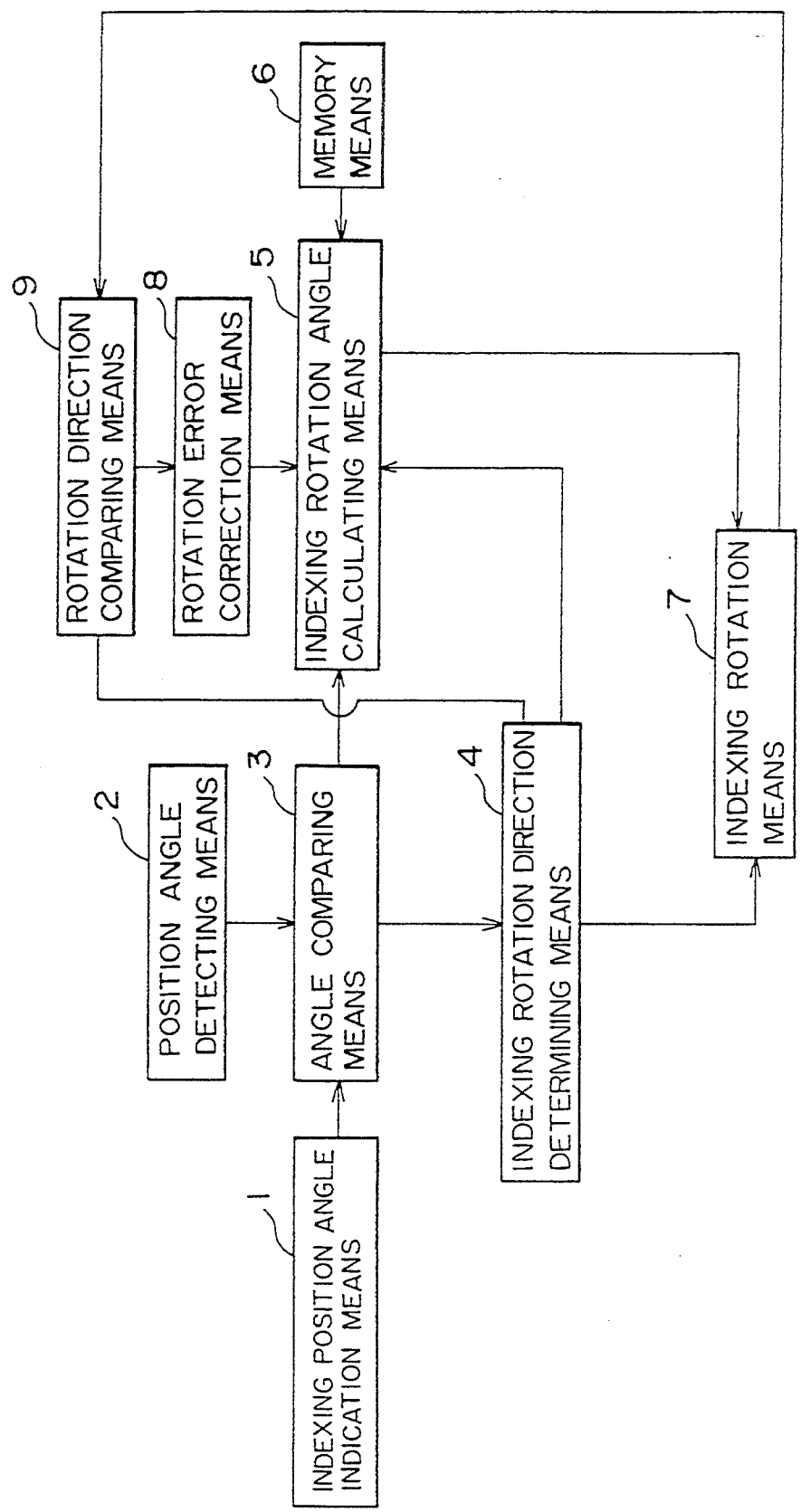
FIG. 1 is a block diagram showing the basic organization of this invention.

FIG. 1 is a block diagram showing a basic organization of the present invention. An attachment indexing apparatus according to the present invention comprises an indexing rotation angle indication means 1 for indicating an objective indexing position angle of the attachment, a position angle detecting means 2 for detecting the present position angle of the attachment, and an angle comparing means 3 for comparing signals from these means 1 and 2 representing the objective indexing position angle and the present position angle, respectively.

A comparison result obtained in the angle comparing means 3 is transmitted to an indexing rotation direction determining means 4, in which an indexing rotation direction of the attachment is then determined. An indexing rotation angle calculating means 5 for calculating the magnitude of the indexing rotation angle of the attachment from the angle comparison result and the indexing rotation direction is operably connected to the angle comparing means 3 and the indexing rotation direction determining means 4. A memory means 6 storing command signal (pulse signal) numbers corresponding to respective indexing position angles of the attachment is also connected to the indexing rotation angle calculating means 5. An indexing rotation direction indication signal from the indexing rotation direction determining means 4 and an indexing rotation angle indication signal from the indexing rotation angle calculating means 5 are inputted into an indexing rotation means, such as a servo-motor, 7 for carrying out the indexing rotation driving to the attachment. A rotation error correction means 8 is connected to the indexing rotation angle calculating means 5 for exactly performing an engagement of the angle position determining means for the final determination with respect to a ram of the attachment.

This rotation error correction means 8 serves to correct or amend the rotation angle error of the indexing rotation angle amount on the basis of a comparison result as to whether or not the indexing rotation direction of the attachment accords with the rotation direction of the spindle carried out just before.

Figure 2:
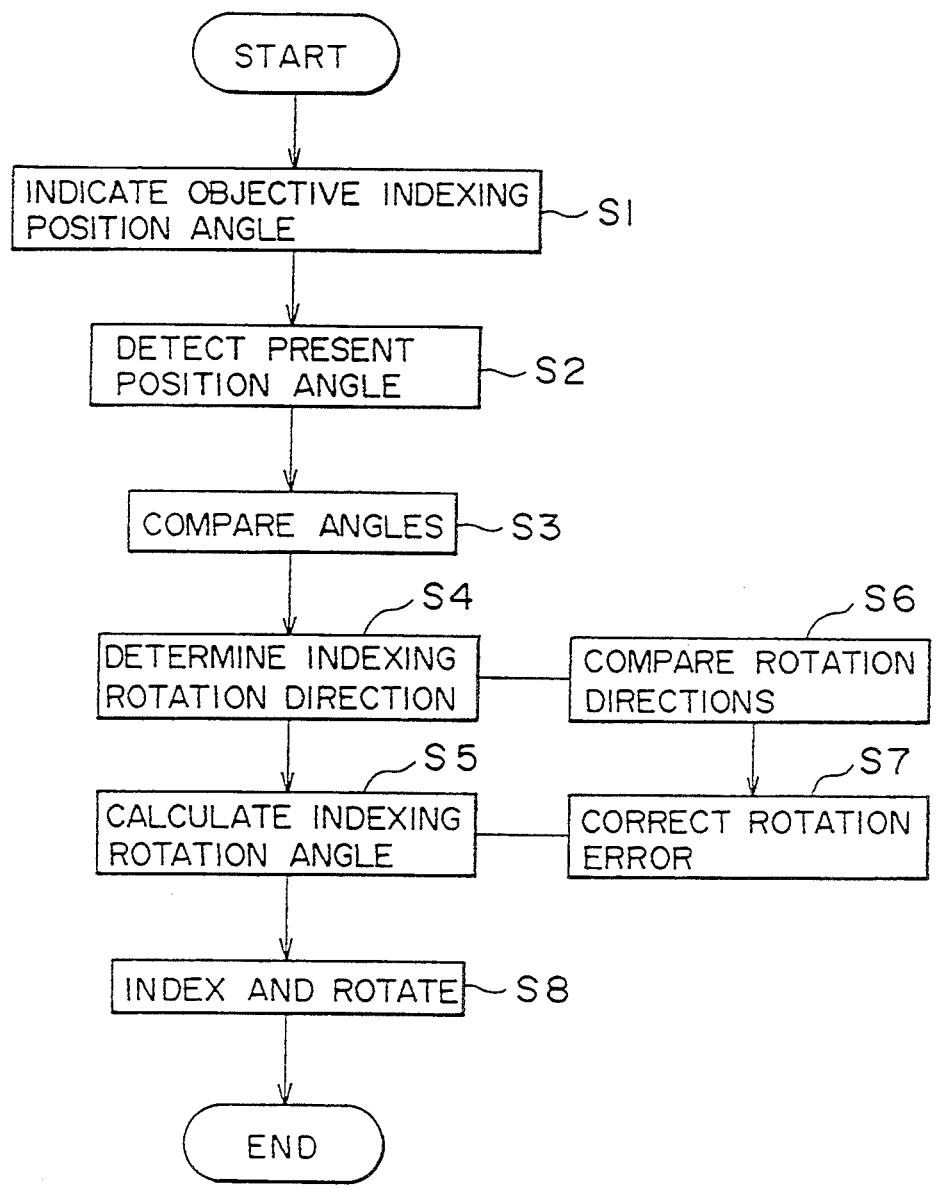
FIG. 2 is a flowchart indicating an indexing method according to this invention.

Operation of the embodiment of the organization described above will be described hereunder with reference to the flowchart of FIG. 2.

Following an indexing operation start instruction for the attachment, the indication of the objective indexing position angle of the attachment (Step S1) and the detection of the present position angle of the attachment are performed (Step S2). Subsequently, in the angle comparing means 3, the objective indexing position angle and the present position angle are compared with each other (Step S3), and, in accordance with the comparison result, the indexing rotation direction of the attachment is then determined (Step S4).

The determination of the indexing rotation direction in accordance with the angle comparison result will be carried out, for example, in the following manner. Differences in angles between the objective indexing position angle and the present position angle of the attachment are calculated in the clockwise direction and the counterclockwise direction, and the magnitudes of these angular differences are compared. In this comparison, the rotation direction having a smaller angular difference is determined as the indexing rotation direction of the attachment, whereby the time required for the indexing rotation of the attachment can be shortened.

Next, in the indexing rotation angle calculating means 5, the indexing rotation angle of the attachment is calculated in accordance with the angle comparison result and the indexing rotation direction (Step S5).

This indexing rotation angle, for example, in the above case, corresponds to the selected smaller angular difference. Then, when the indexing rotation direction is determined, the comparison as to whether or not this indexing rotation direction is the same as the rotation direction of the spindle 21 carried out just before is performed (Step S6). In the case where the rotation directions are reverse to each other, the rotation error amount is added to the calculated indexing rotation angle and then corrected (Step S7).

The indexing rotation angle signal, for example, command signal converted into a pulse signal number, from the indexing rotation angle calculating means is transmitted to the servo-motor and the attachment is rotated by a predetermined angle in the determined indexing rotation direction (Step S8). According to the described series of operations or steps, the attachment can be promptly and precisely indexed and rotated.

Figure 3:
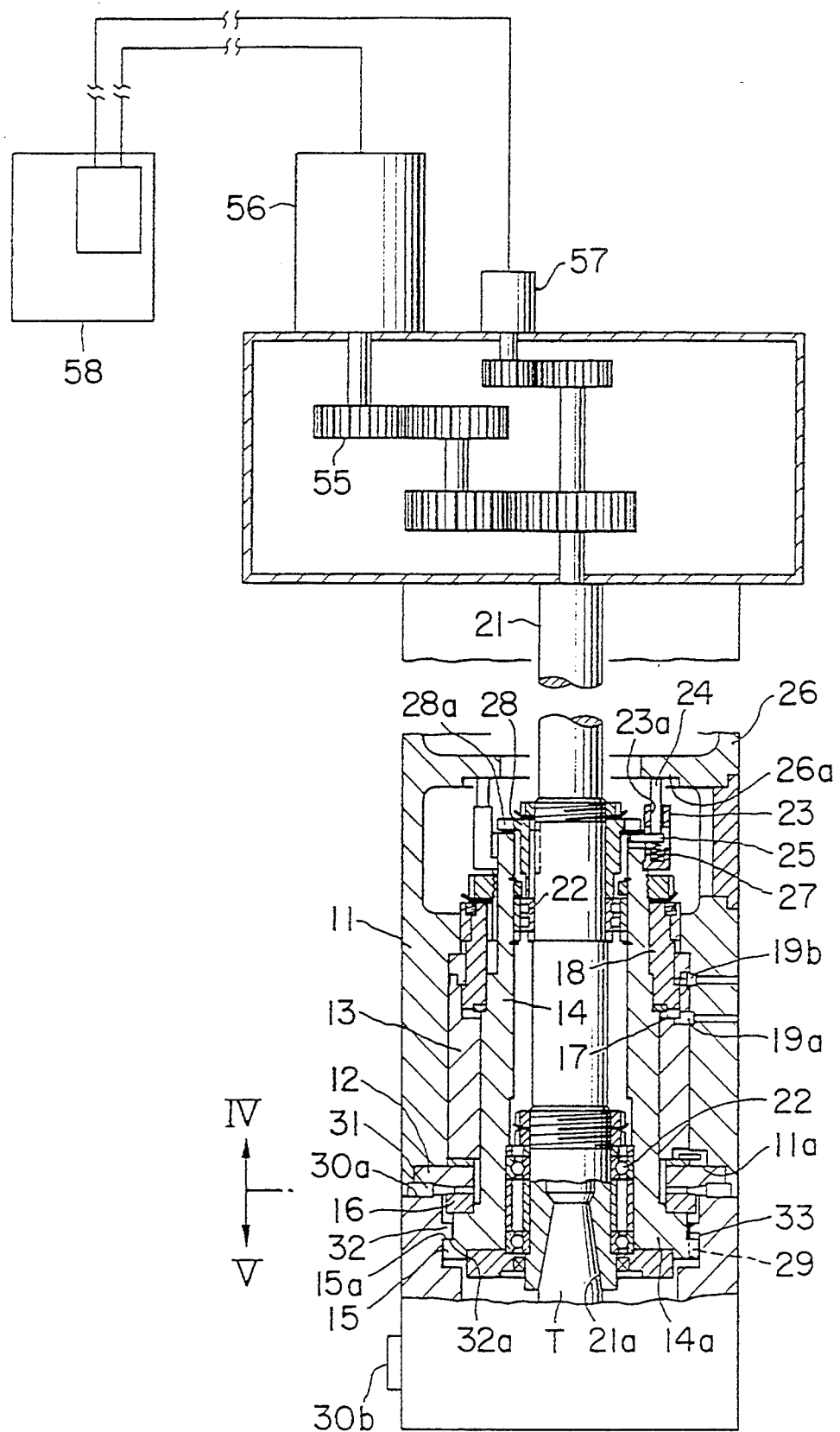
FIG. 3 is a sectional view showing the construction of an indexing apparatus constituting an embodiment of this invention.
Figure 4:
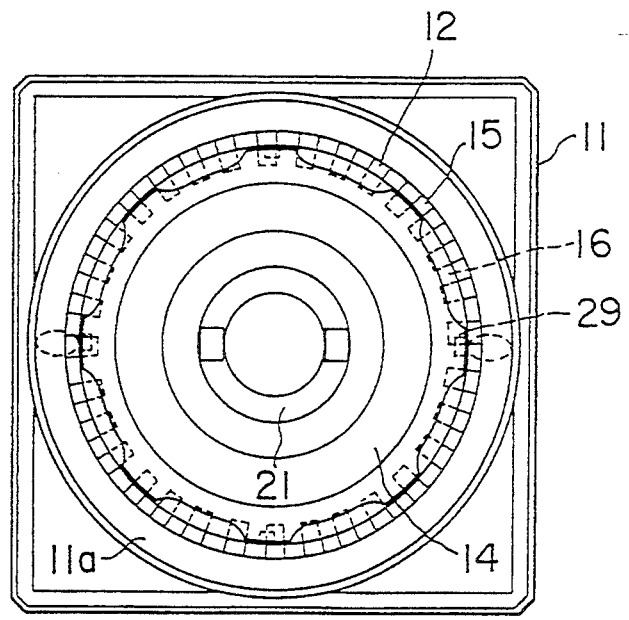
FIG. 4 is a view taken along the line IV—IV in FIG. 3 as viewed in the direction indicated by arrows.
Figure 5:
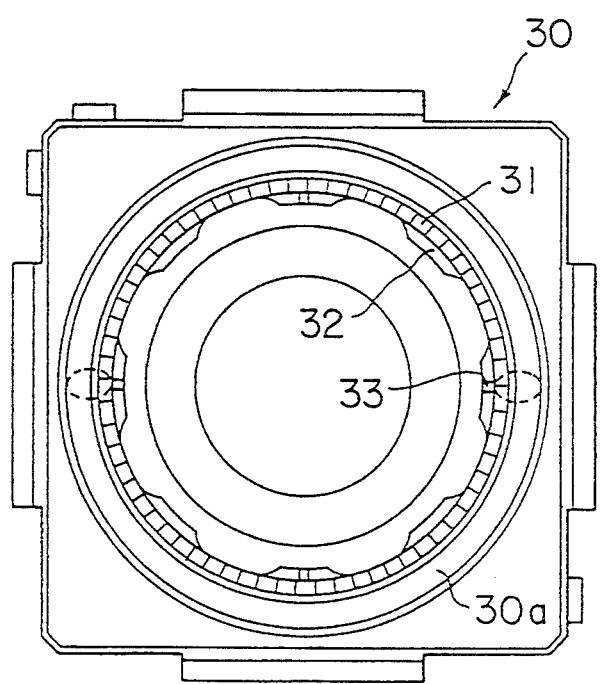
FIG. 5 is a view taken along the line V—V in FIG. 3 as viewed in the direction indicated by arrows.

FIGS. 3 to 5 represent an example in which the attachment indexing apparatus of the present invention is applied to a spindle head of a plano miller (planer type milling machine).

Referring to FIG. 3, reference numeral 11 denotes a hollow ram housing having a front end surface 11a to which a gear coupling, for example, a first Curvic coupling (Trademark of The Gleason Works, U.S.A.) 12 is provided in a ring shape. Within the ram housing 11, a hollow shaft 14 having both ends opened is rotatably and reciprocally supported by way of a stationary hollow cylindrical sleeve 13 so that a flanged portion 14a of the hollow shaft 14 projects beyond the front end surface 11a of the ram housing 11.

As shown in FIG. 4, a plurality of protruding clamp portions 15 projecting radially are formed and spaced equally on the flanged portion 14a in the circumferential direction. The protruding clamp portions 15 are formed, on the side of the ram housing 11, with abutting surfaces 15a in directions perpendicular to the axis of the hollow shaft 14. A second Curvic coupling 16 in the shape of a ring is secured to the hollow shaft 14 in correspondence to the first Curvic coupling 12 of the ram housing 11 at a position separated by a predetermined distance from the clamp portions 15 of the flanged portion 14a so as to be engaged with the first Curvic coupling 12.

A cylinder chamber 17 is defined between the ram housing 11 and a rear side outer periphery of the hollow shaft 14, and a piston member 18 is inserted into the cylinder chamber 17 to be axially movable therein. The piston member 18 is secured to the hollow shaft 14. Oil ports 19a and 19b for supplying and discharging pressurized oil are opened to the cylinder chamber 17.

The spindle 21 is rotatably supported by a bearing 22 in the hollow shaft 14. The front end of the spindle 21 is formed with a taper hole 21a into which a taper shank T of the attachment is to be inserted.

The hollow shaft 14 and the spindle 21 are detachably connected to each other and a connection means therefor is provided for a rear end portion of the hollow shaft. A stopper holding member 23 formed with a through hole 23a axially penetrating the rear end portion of the hollow shaft 21 is provided for the rear end portion, and a slender columnar stopper bar 24 inserted through the through hole 23a is slidably supported by the stopper holding member 23. The stopper bar 24 has one end to which a flat plate-like notch 25 is secured to be directed radially inwardly and also has another end capable of abutting against a stopper surface 26a formed to an inside flanged portion 26 of the ram housing 11. A spring 27 attached to the rear end portion of the hollow shaft 14 abuts against a surface, on the side opposite to the stopper bar 24, of the notch 25 to thereby urge the notch 25 in a rearside direction (upward direction as viewed in FIG. 3) of the hollow shaft 14.

A circumferential flange 28 is provided at a position corresponding to a portion near the rear end portion of the hollow shaft 14 of the spindle 21 so as to extend radially outwardly. The circumferential flange 28 is formed with a cutout 28a having a width slightly larger than the width of the notch 25 provided on the hollow shaft 14 at a portion corresponding to the mounting position of the notch 25.

FIG. 5 is a front view showing the mounting side of the attachment 30 to the ram housing 11. The attachment 30 has a mounting end surface 30a to which a third Curvic coupling 31 to be engaged with the first Curvic coupling 12 of the ram housing 11 is formed in a ring shape. The inner diameter of the third Curvic coupling 31 is made larger than the outer diameter of the second Curvic coupling 16 provided for the hollow shaft 14. A plurality of protruding portions 32 to be clamped are formed at a portion separated by a predetermined space from the third Curvic coupling 31 in a direction opposite to the ram housing 11 in a radially protruding manner and with equal circumferential spacing.

The portions 32 to be clamped are clamped by the protruding clamp portions 15 formed on the front flanged portion of the hollow shaft 14 in abutment thereagainst. The portions 32 are provided with abutting surfaces 32a corresponding to the abutting surfaces 15a of the clamp portions 15. The clamp portions 15 of the hollow shaft 14 and the portions 32 to be clamped of the attachment 30 are crossed with each other in axial directions to be movable. That is, the respective circumferential adjoining spaces of the protruding clamp portions 15 and the protruding portions 32 are made larger than the circumferential widths of the clamp portions 15 and the portions 32 to be clamped, respectively, and the outer diameter of the protruding clamp portion 15 of the hollow shaft 14 is made smaller than the diameter of the bottom of the portion 32 to be clamped. The diameter of the bottom of the protruding clamp portion 15 of the hollow shaft 14 is made smaller than the inner diameter of the portion 32 of the attachment 30.

A fixing key 29 is attached to the protruding clamp portion 15 of the hollow shaft 14 on the side of the abutting surface 15a to be engageable with a recessed groove 33 formed in the abutting surface 32a of the portion 32 to be clamped of the attachment 30.

The spindle 21 is coupled to a servo-motor 56 for driving the spindle 21 through a gear train 55. A means for detecting the indexing position angle of the attachment 30, for example, a rotary encoder or position coder 57, is disposed at a position near the gear train 55. The servo-motor 56 and the rotary encoder 57 are connected to a control unit 60 to perform rotation control of the servo-motor 56 in response to a detection signal from the rotary encoder 57.

Figure 6:
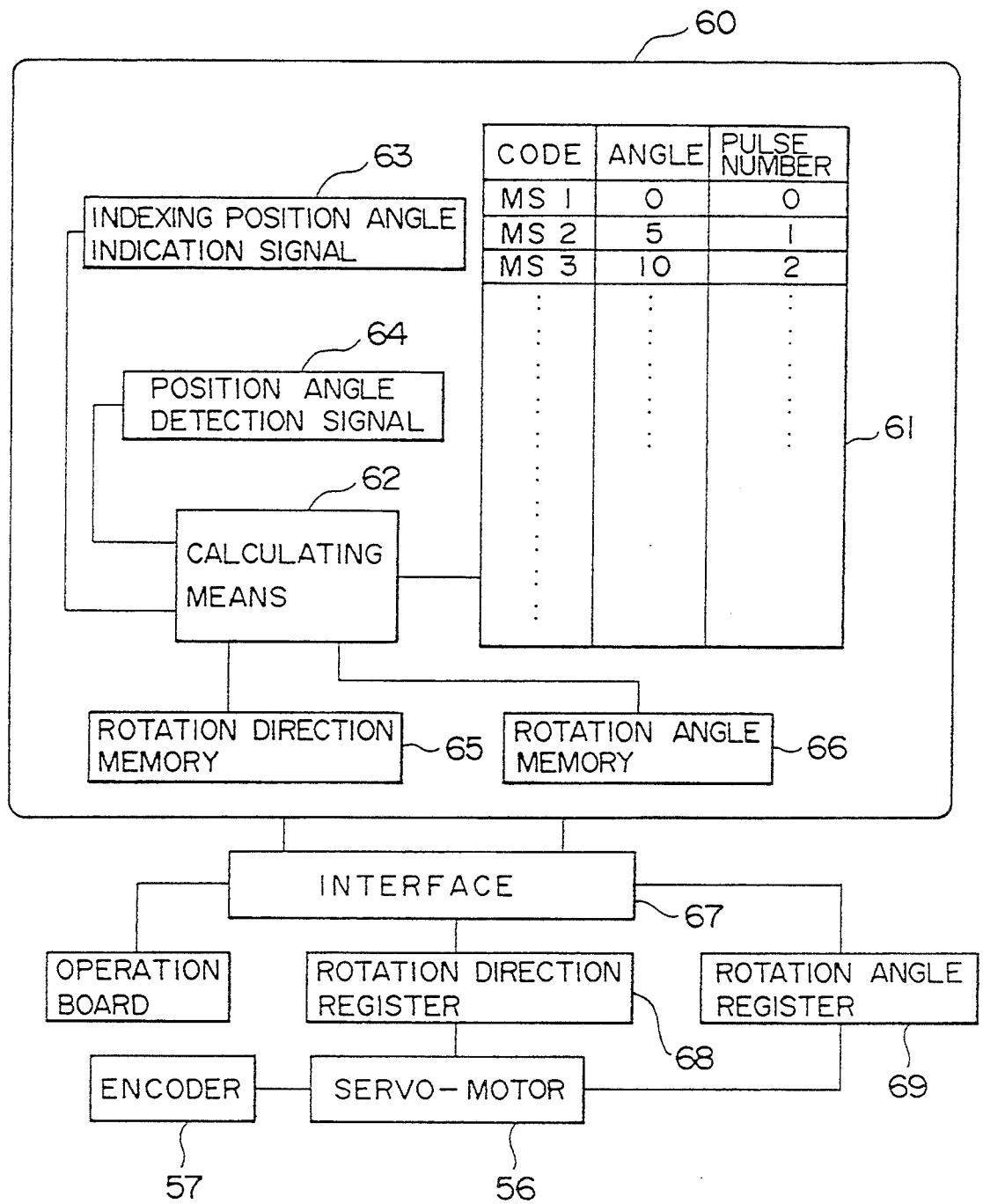
FIG. 6 is a block diagram of a control unit according to this invention.

The control unit 60, as shown in FIG. 6, incorporates a memory means 61 for storing coded pulse signal numbers corresponding respectively to the respective indexing position angles of the attachment. For example, assuming the gear numbers of the Curvic couplings 12, 16 and 31 to be 72 (seventy two), the indexing operations of the attachment can be performed each with 5 angles ($360° \div 72 = 5°$). Then, the coding can be done, for example, by determining the indexing angle of 5° and the pulse signal number 1 with respect to a code MS2 and determining the indexing angle of 10° and the pulse signal number 2 with respect to a code MS3.

A calculation means 62 is composed of a combination of the angle comparing means 3, the indexing rotation direction determining means 4 and the indexing rotation angle amount calculating means 5 described hereinbefore with reference to FIG. 1 and serves to determine the indexing rotation direction of the attachment and calculate the indexing rotation angle in response to a indexing rotation angle indication signal 63 and a position angle detection signal 64. The thus determined rotation direction and indexing rotation angle are stored in a rotation direction memory 65 and a rotation angle memory 66, respectively.

The control unit 60 is connected to the servo-motor 56 through an interface 67, a rotation direction register 68 and a rotation angle register 69.

According to the present embodiment, when the indexing operation start instruction is given, pressurized oil is supplied to the cylinder chamber 17 through the oil port 19b and the piston member 18 is then moved towards the attachment 30 (downward direction as viewed in FIG. 3), whereby the hollow shaft 14 is moved downward together with the spindle 21.

The attachment 30 is held with its abutting surface 32a abutting against the protruding clamp portion 15 of the hollow shaft 14, and the taper shank T of the attachment 30 is also clamped and held in the spindle 21, whereby the attachment 30 is moved downward together with the hollow shaft 14 and the spindle 21. Thus, the first Curvic coupling 12, the third Curvic coupling 31 of the attachment 31 and the second Curvic coupling 16 of the hollow shaft 14 are disengaged.

The present position angle of the attachment 30 is detected by the rotary encoder 57 and the thus detected signal and the objective indexing position angle signal of the attachment are compared with each other in the calculation means 62, and, in accordance with the method described above, the indexing rotation direction of the attachment 30 is determined and stored in the rotation direction memory 65. Furthermore, a code corresponding to the indexing rotation angle is selected in response to the data of the memory means 61 and then stored in the rotation angle memory 66.

The thus stored indexing rotation direction signal and the selected code are inputted into the servo-motor 56 through the interface 67, and the servo-motor 56 is then driven in the predetermined rotation direction. Accordingly, the attachment 30 performs the indexing rotation and the tool mounting position 30b of the attachment 30 is rotated to the predetermined position.

The rotation angle of the servo-motor 56 is controlled by counting the pulse signal numbers corresponding to the selected code, and upon the counting of the predetermined signal number, the counting is stopped.

In the next step, the pressurized oil is supplied through the oil port 19a, and the piston member 18 and the hollow shaft 14 are moved upward, thereby moving upward the attachment 30 together with the spindle 21. The attachment 30 is again fixed to the ram housing 11 by the engagement of the third Curvic coupling 31 of the attachment with the first and second Curvic couplings 12 and 16, thus completing the indexing of the attachment.

In order to achieve the engagement of the first and second Curvic couplings 12 and 16 with the third Curvic coupling 31 with high performance, as described above, the comparison of the indexing rotation direction of the attachment with the rotation direction of the spindle performed just before is carried out. In this comparison, when these rotation directions are reverse to each other, the rotation error angle corresponding to the error amount such as twisting of the spindle 21 and backlash of the gear train 55 is added to the required indexing rotation angle amount. According to such procedure, a precise engagement of the Curvic couplings can be always achieved even in the case where the indexing rotation direction of the attachment 30 is reverse to the rotation direction of the spindle 21.

Figure 7:
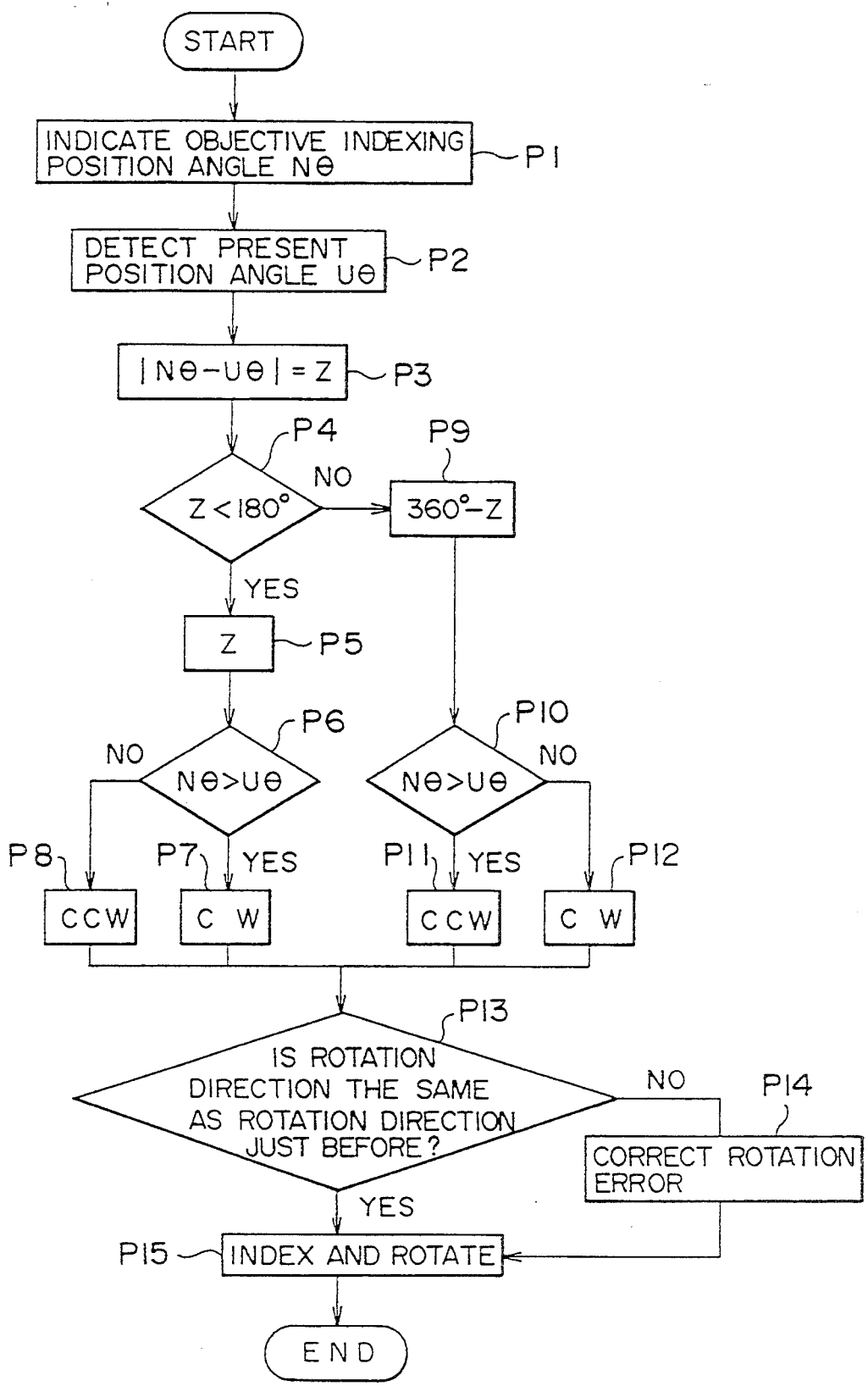
FIGS. 7 and 8 are flowcharts representing other embodiments of the indexing method of this invention.

FIG. 7 represents a flowchart showing another embodiment of the determination of the indexing rotation direction and the calculation of the indexing rotation angle. According to this embodiment, an objective indexing position angle $N\theta$ is first indicated (Step P1). The present position angle $U\theta$ is then detected (Step P2), and the angular difference Z therebetween is also calculated (Step P3).

This angular difference Z is compared with 180° to determining whether or not this difference Z is more or is less than 180° (Step P4). If the difference Z is less than 180°, the angular difference Z is determined as the indexing rotation angle (Step P5), and the objective indexing position angle $N\theta$ and the present position angle $U\theta$ are compared (Step P6). If the objective indexing position angle $N\theta$ is larger than the present position angle $U\theta$, the indexing rotation direction is determined to be the clockwise direction (CW) (Step P7). On the contrary, if the objective indexing position angle $N\theta$ is less than the present position angle $U\theta$, the indexing rotation direction is determined to be the counterclockwise direction (CCW) (Step P8).

In the case where the angular difference Z is greater than 180°, the indexing rotation angle is calculated from an equation (360°$-$Z) (Step P9) to thereby compare the value of the objective indexing position angle $N\theta$ with that of the present position angle $U\theta$ (Step P10). If the objective indexing position angle $N\theta$ is greater than the present position angle $U\theta$, the indexing rotation direction is determined to be the counterclockwise direction (CCW) (Step P11). On the contrary, if the aimed indexing position angle $N\theta$ is less than the present position angle $U\theta$, the indexing rotation direction is determined to be the clockwise direction (CW) (Step P12).

In the manner described above, after the indexing rotation angle and the indexing rotation direction have been determined, it is determined whether or not the indexing rotation direction is the same as the rotation direction of the spindle 21 immediately before (Step P13). If the rotation directions are opposite to each other, the correction of the rotation error amount is calculated (Step P14) as described hereinbefore, and the indexing rotation by the required index rotation angle amount is then done in the determined rotation direction (Step P15).

Figure 8:
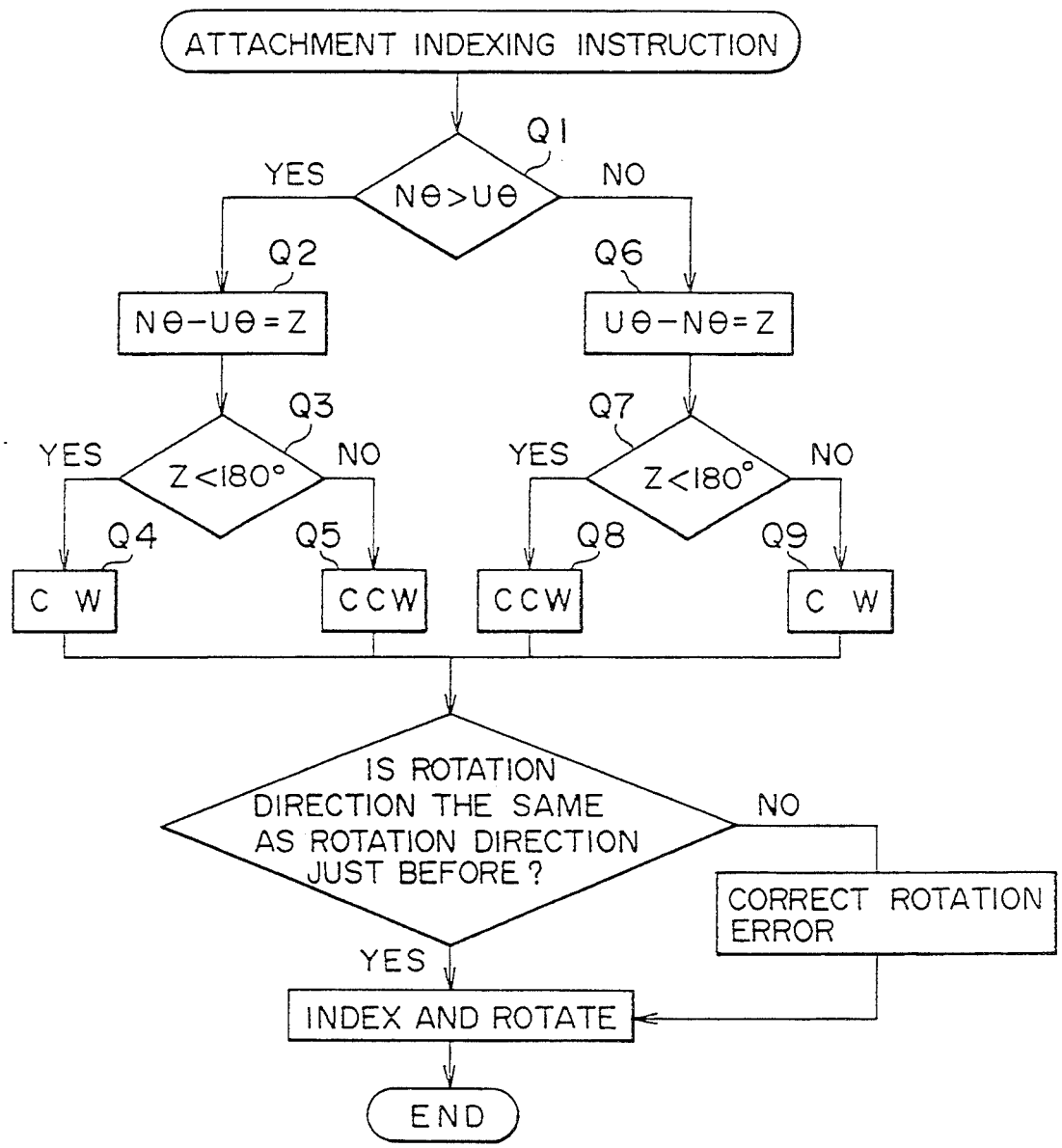

FIG. 8 is a flowchart representing a modified embodiment of the calculation method of the rotation direction and the rotation direction angle calculation made with reference to FIG. 7.

In this modified embodiment, the objective indexing position angle $N\theta$ and the present position angle $U\theta$ are compared (Step Q1). If the objective indexing position angle $N\theta$ is larger than the present position angle $U\theta$, the indexing rotation angle amount Z is calculated from the equation ($N\theta - U\theta$) (Step Q2). Subsequently, the comparison as to whether this angle amount Z is larger than 180° or not is carried out (Step Q3). If the angle Z is less than 180°, the indexing rotation direction is determined to be the clockwise direction (CW) (Step Q4). On the contrary, if the angle Z is greater than 180°, the indexing rotation direction is determined to be the counterclockwise direction (CCW) (Step Q5).

On the other hand, if the objective indexing position angle $N\theta$ is less than the present position angle $U\theta$, the indexing rotation angle amount Z is calculated from the equation ($U\theta - N\theta$) (Step Q6). Subsequently, the comparison as to whether this angle amount Z is greater than 180° or not is carried out (Step Q7). If the indexing rotation angle Z is smaller than 180°, the indexing rotation direction is determined to be the counterclockwise direction (CCW) (Step Q8). On the contrary, if the angle Z is greater than 180°, the indexing rotation direction is determined to be the clockwise direction (CW) (Step Q5). The steps thereafter are the same as those described with reference to the former embodiment of FIG. 7.

FIGS. 9 to 12 illustrate other embodiments according to the present invention, which are characterized in that an indexing angle on a program for the attachment can be automatically accorded with an actual indexing angle at a time when the program is again started after the interruption of the operation of a machine.

Figure 9:
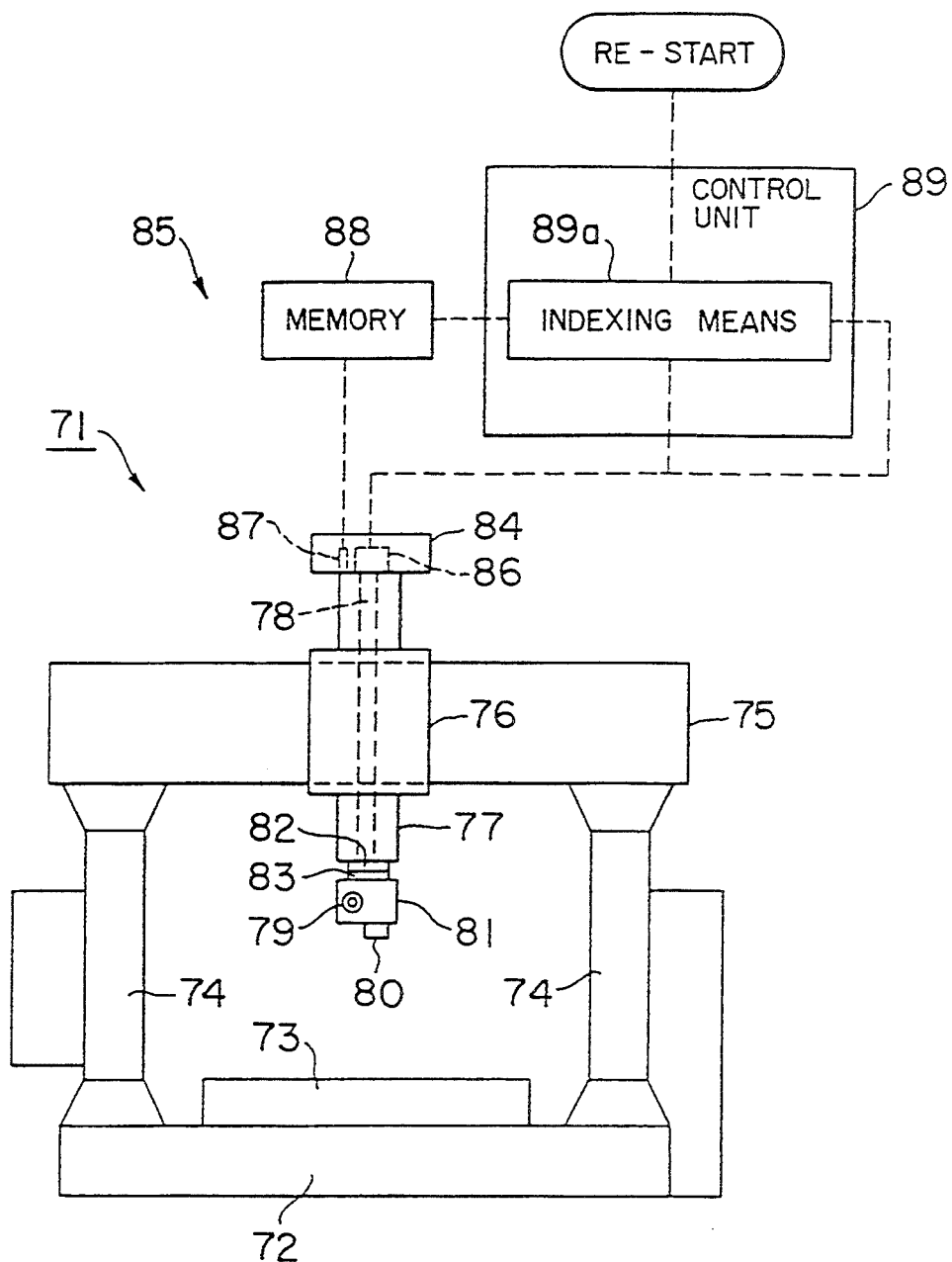
FIG. 9 is a combination of an elevation and a block diagram of a gate-type NC machine tool to which this invention is applied.

FIG. 9 shows a front view showing the entire structure of a gate-type NC machine tool (plano miller) together with its control block diagram. The NC machine tool comprises a machining center 71 provided with a bed 72 on an upper surface of which a table 73 is mounted.

A pair of columns 74 stand on opposite ends of the bed 72 and a horizontal beam 75 is laid across the upper ends of the columns 74. A saddle 76 is so supported on the horizontal beam 75 as to be movable in the longitudinal direction of the beam 75. Furthermore, a ram 77 is inserted into the saddle and supported thereby to be vertically movable and not rotatable. A support shaft 78 is inserted through the ram 77.

On the lower end of the ram 77 is mounted an attachment 81 having a horizontal shaft 79 extending horizontally and a vertical shaft 80 extending vertically in a manner such that the attachment 81 is positioned through a pair of Curvic couplings 82 and 83 which are engageable with each other.

A box 84 is connected to the upper end portion of the ram 77, and an indexing apparatus 85 for automatically indexing the position angle of the attachment 81 is provided in the box 84. The indexing apparatus 85 comprises the support shaft 78, a servo-motor 86 coupled to the support shaft 78 and serving to index and rotate the attachment 81, a rotary encoder 87 for detecting the angle position of the attachment 81 by detecting the rotation angle of the servo-motor 86, a memory 88 connected to the rotary encoder 87 and adapted to store a stop angle of the attachment 81 at least at the operation stop period of the apparatus, and a control unit 89 connected to the memory 88 and adapted to control the rotation of the servo-motor 86 and the angle position of the attachment 81.

As the rotary encoder 87, an absolute-type one such as an optical code plate or the like in which an absolute angle (position) of the servo-motor in one rotation thereof can be recognized is used.

The control unit 89 is provided with an indexing means 89a for calling back a stop angle of the attachment at the operation stop period and indexing the attachment to this angle position. This indexing means 89a is operated in accordance with the execution of a program re-start function, that is, at a time when a cycle start button is depressed after the operation stop time.

Figure 10:
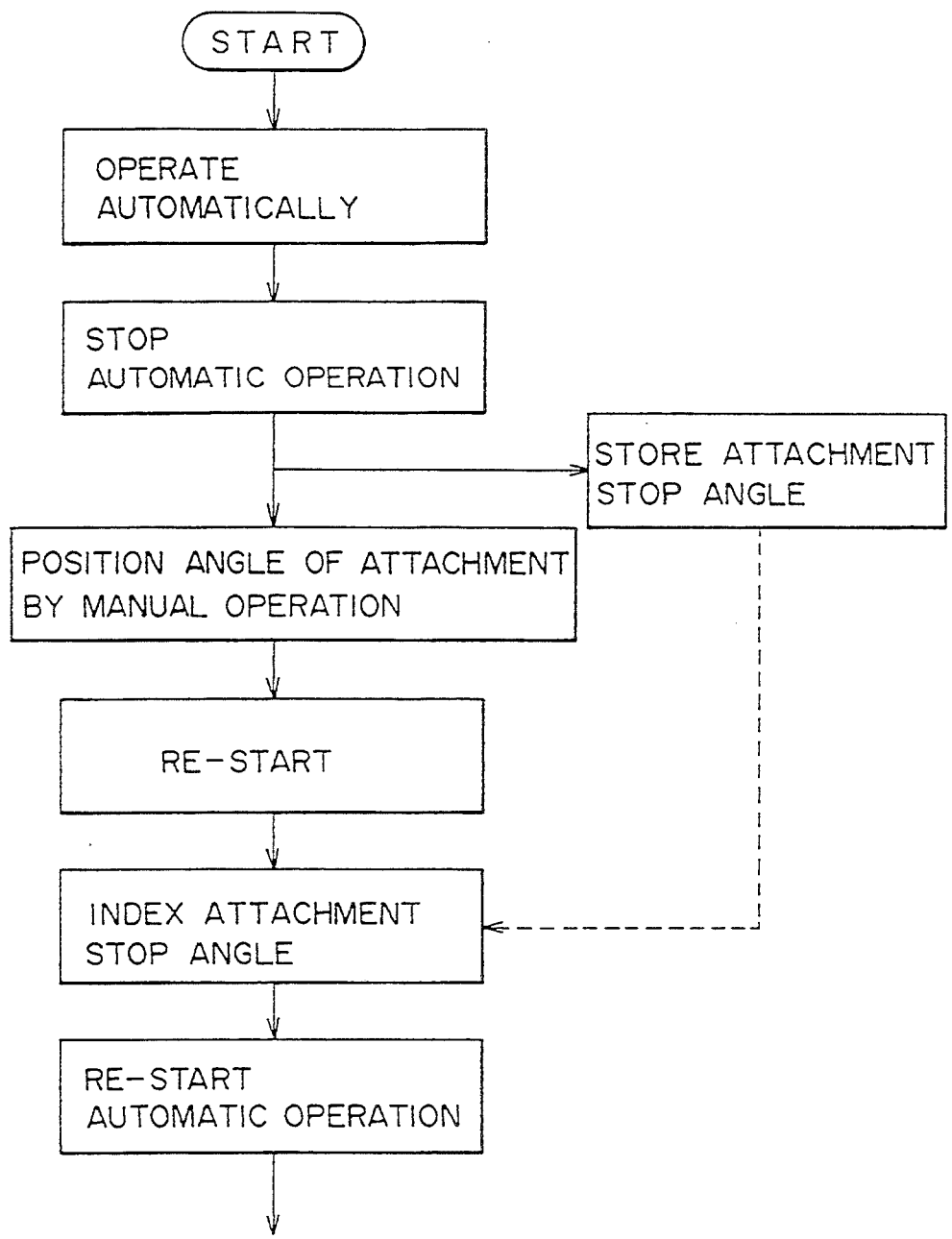
FIG. 10 is a flowchart for a description of the operation of the example shown in FIG. 9.

The operation of the above embodiment will be described hereunder with reference to the flowchart of FIG. 10.

First, the cycle start button is depressed, and then, the machining center 71 starts its automatic operation. Thereafter, at the time when the automatic operation is interrupted, i.e., stopped, by any cause or fault such as tool breakage, the stop angle of the attachment 81 due to this operation stop is detected by the rotary encoder 87 and the detected data is stored in the memory 88.

At this time, since the absolute-type rotary encoder 87 is utilized, this stop angle is an absolute angle (position) within one rotation thereof.

Then, after the remedy of the fault which may include a change of the angle position of the attachment, the angle position determination is carried out in accordance with a manual operation of the attachment 81, and the cycle start button is depressed to execute the program re-start function. At this moment, the stop angle of the attachment stored in the memory 88 is called back to the indexing means 89a of the control unit 89, and the servo-motor 86 is driven. The angle of the attachment 81 is indexed to this stop angle, after which the automatic operation is again started.

According to the manner described above, the actual indexing position of the attachment and the indexing position thereof on the program are automatically accorded, whereby the automatic operation can be re-started with no fault.

Figure 11:
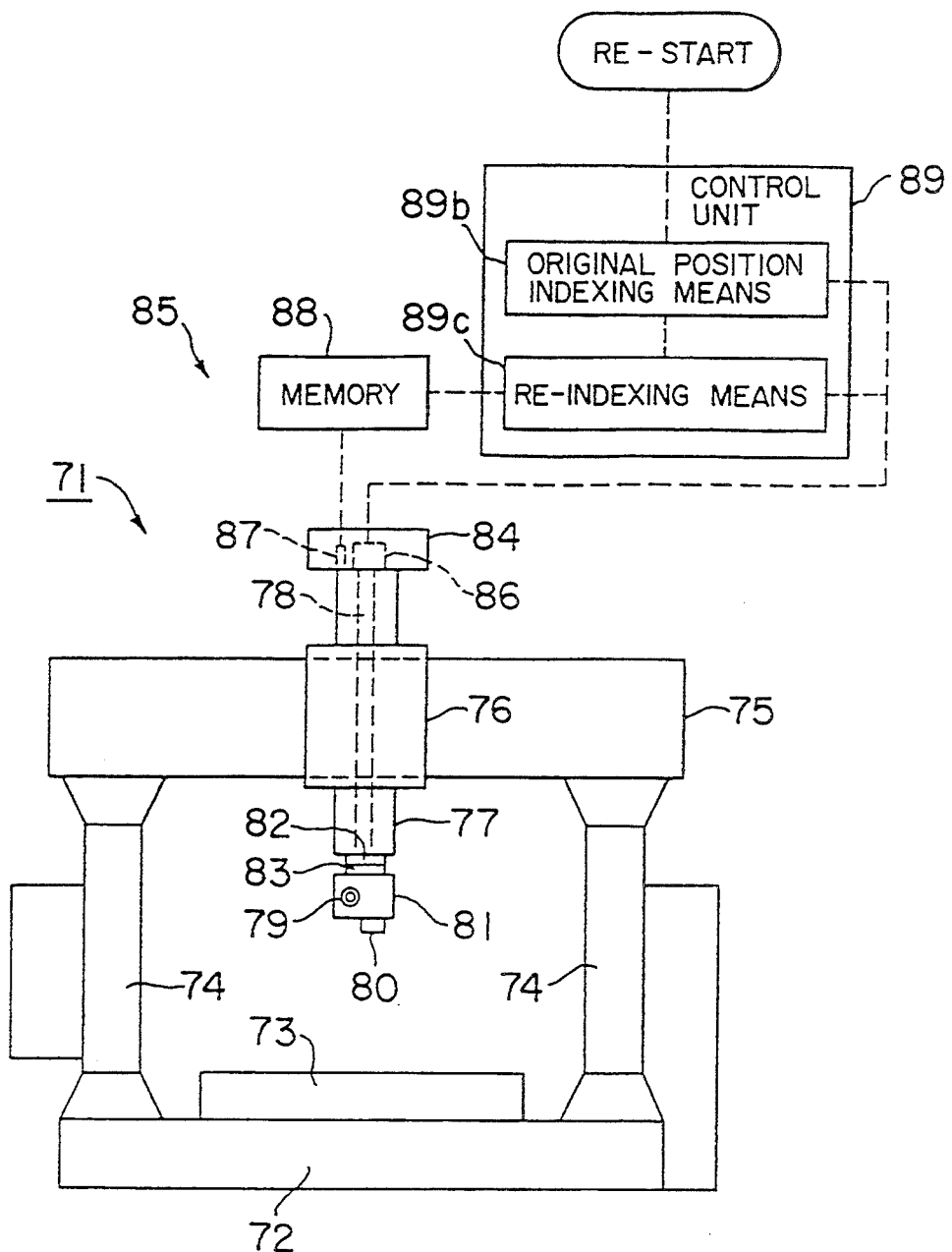
FIG. 11 is a combination of an elevation and a block diagram representing a modification of the embodiment illustrated in FIG. 9.

FIG. 11 is a modification of the embodiment described above, which differs from the former embodiment on the following points. Namely, in this modified embodiment, the absolute-type rotary encoder 87 is replaced by an incremental-type one such as a photoelectric-type pulse generator or detector utilizing moire fringes in which a relative position from an original position is detected. Furthermore, the control unit 89 is provided with an original position indexing means 89b for returning the attachment 81 to an original angle position and a re-indexing means 89c for calling back the stop angle of the attachment from the memory 88 and indexing the attachment 81 to this angle position after the returning to the original position. Both these means 89b and 89c are operated in accordance with the program re-start, i.e., at a time of depression of the cycle start button after the operation stop period.

Figure 12:
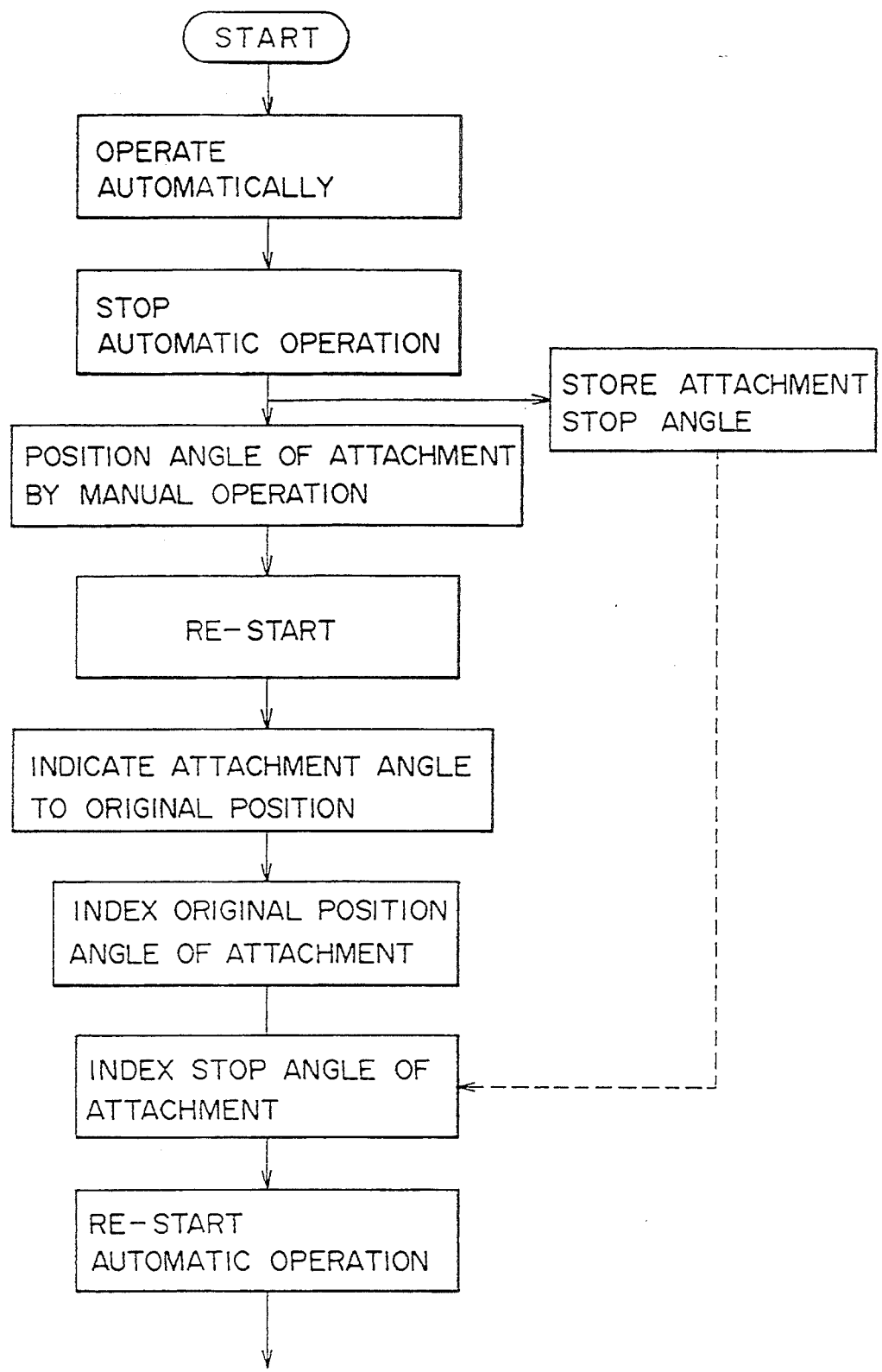
FIG. 12 is a flowchart for a description of the embodiment of FIG. 11.

As shown in FIG. 12, after the remedy of the fault including the angle position change of the attachment 81, the angle positioning by a manual operation of the attachment 81 is performed. Then, the cycle start button is depressed to execute the program re-start. At this time, an angle original position return instruction is inputted into the original position indexing means 89b of the control unit 89 to thereby drive the servo-motor 86 and execute the original angle position indexing of the attachment 81. Meanwhile, the stop angle position (relative angle from the original position) of the attachment 81 stored in the memory 88 is called back to the re-indexing means 89c of the control unit 89. After the returning of the attachment 81 to the original position, the servo-motor 86 is driven, thereby indexing the attachment to this stop position, and thereafter, the automatic operation is started again.

According to the described embodiment, at the time of re-start of the automatic operation after the interruption and remedy of the apparatus, the indexing position of the attachment on the program and the actual indexing position can be automatically made to coincide with each other, whereby interference of a workpiece with the attachment at the time of the operation re-start can be positively prevented, thus re-starting the operation stably.

INDUSTRIAL APPLICABILITY

As described hereinabove, according to the present invention, the attachment indexing time can be shortened significantly and the working efficiency of the machine tool can be also improved. Furthermore, the error in rotation due to twisting of the spindle and backlash of the gear train can be eliminated, and at the time of indexing positioning of the attachment, the angle positioning means can be accurately engaged.

Still furthermore, at the time of re-starting the program after the interruption of the operation of the machine tool, the indexing position of the attachment on the program and the actual indexing position can be automatically made to coincide with each other, thus performing the operation re-start stably.

The present invention can attain particularly superior effects in the utilization thereof for a large-sized machine tool including an attachment such as a gate-type machining center.

We claim:

1. A method of indexing an attachment detachably mounted on a spindle head of a machine tool through an angle positioning means, comprising the steps of:
   indicating an objective indexing position angle of the attachment;
   detecting the present position angle of the attachment;

comparing the objective indexing position angle with the present position angle;

determining the indexing rotation direction of the attachment in accordance with the compared result;

calculating the attachment indexing rotation angle from the compared result and the indexing rotation direction; and indexing and rotating the attachment by the calculated indexing rotation angle in the determined indexing rotation direction, wherein the direction for an indexing rotation is compared with the rotation direction of a drive means carried out just before and a rotation angle error is added to the indexing rotation angle in the case where the two rotation directions are opposite to each other.

2. An indexing method according to claim 1, wherein: the angular difference between the objective indexing position angle of the attachment and the present position angle is obtained; said angular difference is compared with 180° to determine whether or not the angular difference is greater than 180°; and, in accordance with the result of the comparison, it is determined that the indexing rotation direction of the attachment is to be clockwise or counterclockwise.

3. An indexing method according to claim 2, wherein the indexing rotation is executed in the clockwise direction when the angular difference is less than 180° and the objective indexing position angle is greater than the present position angle, and the indexing rotation is executed in the counterclockwise direction when the angular difference is less than 180° and the objective indexing position angle is less than the present position angle, and the indexing rotation is executed in the clockwise direction when the angular difference is greater than 180° and the objective indexing position angle is less than the present position angle, and the indexing rotation is executed in the counterclockwise direction when the angular difference is greater than 180° and the objective indexing position angle is greater than the present position angle.

4. An indexing method according to claim 1, wherein: angular differences between the objective indexing position angle of the attachment and the present position angle thereof are obtained with respect to the clockwise direction and the counterclockwise direction; the angular differences are compared; and the rotation direction in the case of the smaller angular difference is determined as the indexing rotation direction.

5. An indexing method according to claim 1, wherein: pulse signal numbers corresponding to respective indexing position angles of the attachment are stored; pulse signal numbers corresponding to the indexing rotation angle are indicated on the basis of the stored pulse signal numbers; and a pulse motor is driven through an angle corresponding to the indicated pulse signal numbers to thereby index the attachment.

6. A method of indexing an attachment detachably mounted on a spindle head of a machine tool through an angle positioning means, comprising the steps of:

storing a stop position angle of the attachment at an operation stop period in a memory means;

calling back the stop position angle of the attachment from the storing means; and indexing and rotating the attachment to the called back stop position angle, wherein the attachment is once returned to an original position and the attachment is thereafter indexed and rotated to the called back stop position angle.

7. An apparatus for indexing an attachment detaching mounted on a spindle head of a machine tool through an angle positioning means comprising:

an indexing rotation angle indication means for indicating an objective indexing position angle of the attachment;

a position angle detecting means for detecting the present position angle of the attachment;

an angle comparing means for comparing the objective indexing position angle with the present position angle;

an indexing rotation direction determining means for determining the indexing rotation direction of the attachment in accordance with the compared result;

an indexing rotation angle calculating means for calculating the indexing rotation angle of the attachment in accordance with the compared result and the determined indexing rotation direction;

an indexing rotation means for indexing and rotating the attachment in accordance with the result of the rotation direction determination from the rotation direction determining means and the indexing rotation angle from the indexing rotation angle calculating means;

a rotation direction comparing means for comparing the indexing rotation direction with a rotation direction of a driving system performed just before as to whether or not the indexing direction is the same as the rotation direction of the driving system; and a rotation error correction means for correcting a rotation angle error of the indexing rotation angle in accordance with the compared result of the rotation direction comparison means.

8. An indexing apparatus according to claim 7, further comprising:

a memory means for storing pulse signal numbers corresponding to respective indexing position angles of the attachment;

a pulse signal number indication means for indicating the pulse numbers corresponding to the indexing rotation angle in accordance with the stored pulse numbers; and a pulse motor driven in rotation by an amount corresponding to the indicated pulse signal numbers.

9. An indexing apparatus according to claim 7, wherein the angle position determining means is a gear coupling.

10. An apparatus for indexing an attachment detachably mounted on a spindle head of a machine tool through an angle position determining means, comprising:

a memory means for storing a stop position angle of the attachment at an operation stop instant;

an indexing rotation means for calling back the stop position angle of the attachment from the memory means;

indexing and rotating the attachment to the called back stop position angle of the attachment;

an original position returning means for returning the attachment to an original position; and a re-indexing means for indexing and rotating the attachment to the called back stop position angle of the attachment after the returning to the original position.

* * * * *